US007612558B2

(12) United States Patent
Hayashi et al.

(10) Patent No.: US 7,612,558 B2
(45) Date of Patent: Nov. 3, 2009

(54) BILL DISCRIMINATION DEVICE AND SENSOR FOR SAME

(75) Inventors: Yasutoshi Hayashi, Nagoya (JP); Atsushi Kato, Nagoya (JP)

(73) Assignee: Hitachi-Omron Terminal Solutions Corporation, Tokyo (JP)

( * ) Notice: Subject to any disclaimer, the term of this patent is extended or adjusted under 35 U.S.C. 154(b) by 0 days.

(21) Appl. No.: 12/136,448

(22) Filed: Jun. 10, 2008

(65) Prior Publication Data

US 2009/0001977 A1 Jan. 1, 2009

(30) Foreign Application Priority Data

Jun. 22, 2007 (JP) ............................. 2007-164880

(51) Int. Cl.
*G01B 7/06* (2006.01)
*G07D 5/02* (2006.01)
*G07D 5/08* (2006.01)

(52) U.S. Cl. ................... 324/229; 324/207.15; 194/335

(58) Field of Classification Search ............ 324/207.11, 324/207.15–207.19, 228–229, 239; 271/265.01, 271/265.04; 382/135, 137–140; 194/210–213, 194/302, 320, 334–335

See application file for complete search history.

(56) References Cited

U.S. PATENT DOCUMENTS 5,446,377 A 8/1995 Mohri et al.
2001/0035329 A1 11/2001 Toda et al.
2003/0141653 A1 7/2003 Kumamoto et al.

FOREIGN PATENT DOCUMENTS

| | | |
|---|---|---|
| EP | 0 025 976 A | 4/1981 |
| EP | 1 720 135 A | 11/2006 |
| EP | 1 764 751 A1 | 3/2007 |
| JP | 61-034401 | 2/1986 |
| JP | 4-195811 | 7/1992 |
| JP | 2005-182285 | 7/2005 |
| JP | 2006-4206 | 1/2006 |

OTHER PUBLICATIONS

European Search Report issued in Patent Application No. 08010453.2-229 dated on Nov. 6, 2008.

*Primary Examiner*—Bot L LeDynh
(74) *Attorney, Agent, or Firm*—McDermott Will & Emery LLP

(57) ABSTRACT

The sensor portion of the bill discrimination device has a variable inductance portion whose inductance changes depending on thickness of the bill and the magnetic ink amount, and an output signal generator for generating an output signal depending on the inductance of the variable inductance portion. The variable inductance portion includes a contact member which may have magnetostrictive behavior, and a coil portion disposed about the perimeter thereof. The contact member is positioned so as to be subjected to pressing force of a spring via an auxiliary roller. When the pressing force received from the spring changes depending on the thickness of a currency bill, the magnetic permeability of the contact member will change and the inductance of the variable inductance portion will change. At the same time, the inductance of the variable inductance portion will also change depending on the magnetic charge of the currency bill.

8 Claims, 8 Drawing Sheets

BILL DISCRIMINATION DEVICE AND SENSOR FOR SAME

CROSS-REFERENCE TO RELATED APPLICATIONS

The present application claims the priority based on Japanese Patent Application No. 2007-164880 filed on Jun. 22, 2007, the disclosure of which is hereby incorporated by reference in its entirety.

BACKGROUND OF THE INVENTION

1. Field of the Invention

The present invention relates to an apparatus for identification of type and/or authenticity of documents which contain magnetic inks.

2. Description of the Related Art

There are known various bill discrimination devices which are capable of discriminating or identifying bill types (denominations) and/or authenticity of bank notes and other bills which contain magnetic inks. In such bill discrimination devices, discrimination can be carried out by detecting magnetic ink content or the thickness of the bill, as disclosed in the following patent publications.

JP 4-195811 A

JP 2006-4206 A

In order to improve accuracy of discrimination by such devices, it would be preferable to be able to detect both document thickness and magnetic ink content. However, doing so would require increases in the type and number of sensors, possibly resulting in a device that is larger and more complex. No innovations to date have fully addressed this problem.

SUMMARY OF THE INVENTION

An object of the present invention is to provide a technology with a simple design whereby document thickness and magnetic ink content may be detected simultaneously.

According to an aspect of the present invention, there is provides a bill discrimination device for discrimination of a bill containing magnetic ink. The device comprises a sensor unit for detecting a bill, and an discrimination unit for discriminating the bill based on an output signal of the sensor unit. The sensor unit includes a variable inductance portion whose inductance changes responsive to thickness and magnetic ink amount of the bill, and an output signal generator for generating an output signal depending on the inductance of the variable inductance portion.

With this configuration, the sensor output represents both magnetic ink amount and bill thickness in the form of changes in inductance of the variable inductance portion, whereby the accuracy of discrimination by the bill discrimination device will be improved through a simple design.

The variable inductance portion may includes a contact member which is to contact a surface of the bill as the bill passes by the sensor unit, a coil portion disposed around the contact member, and an urging mechanism to apply pressing force to the contact member via the bill. The contact member may be constituted by a magnetostrictive element whose magnetic permeability changes responsive to strain produced by the pressing force from the urging mechanism.

With this configuration, it is possible for the sensor unit to output change in inductance of the inductance portion depending on strain produced in the contact member in response to the bill thickness through the urging mechanism.

At the same time, it is possible for the sensor unit to output change in inductance of the inductance portion depending on the magnetic ink amount contained in an area within the bill.

According to another aspect of the present invention, there is provided a sensor unit for discrimination of a bill containing magnetic ink. The sensor unit comprises a variable inductance portion whose inductance changes responsive to thickness and magnetic ink amount of the bill, and an output signal generator for generating an output signal depending on the inductance of the variable inductance portion. The variable inductance portion includes a contact member which is to contact a surface of the bill as the bill passes by the sensor unit, a coil portion disposed around the contact member, and an urging mechanism to apply pressing force to the contact member via the bill. The contact member may be constituted by a magnetostrictive element whose magnetic permeability changes responsive to strain produced by the pressing force from the urging mechanism.

With this configuration, it is possible to construct a sensor unit capable of simultaneously detecting thickness and magnetic ink amount of the bill.

It is possible for the present invention to be reduced to practice in various other modes, for example, a sensor unit for detecting documents, a bill discrimination device furnished with such a sensor unit, and methods for detecting or discriminating bills.

DESCRIPTION OF THE PREFERRED EMBODIMENT

A. Embodiment 1

Figure 1:
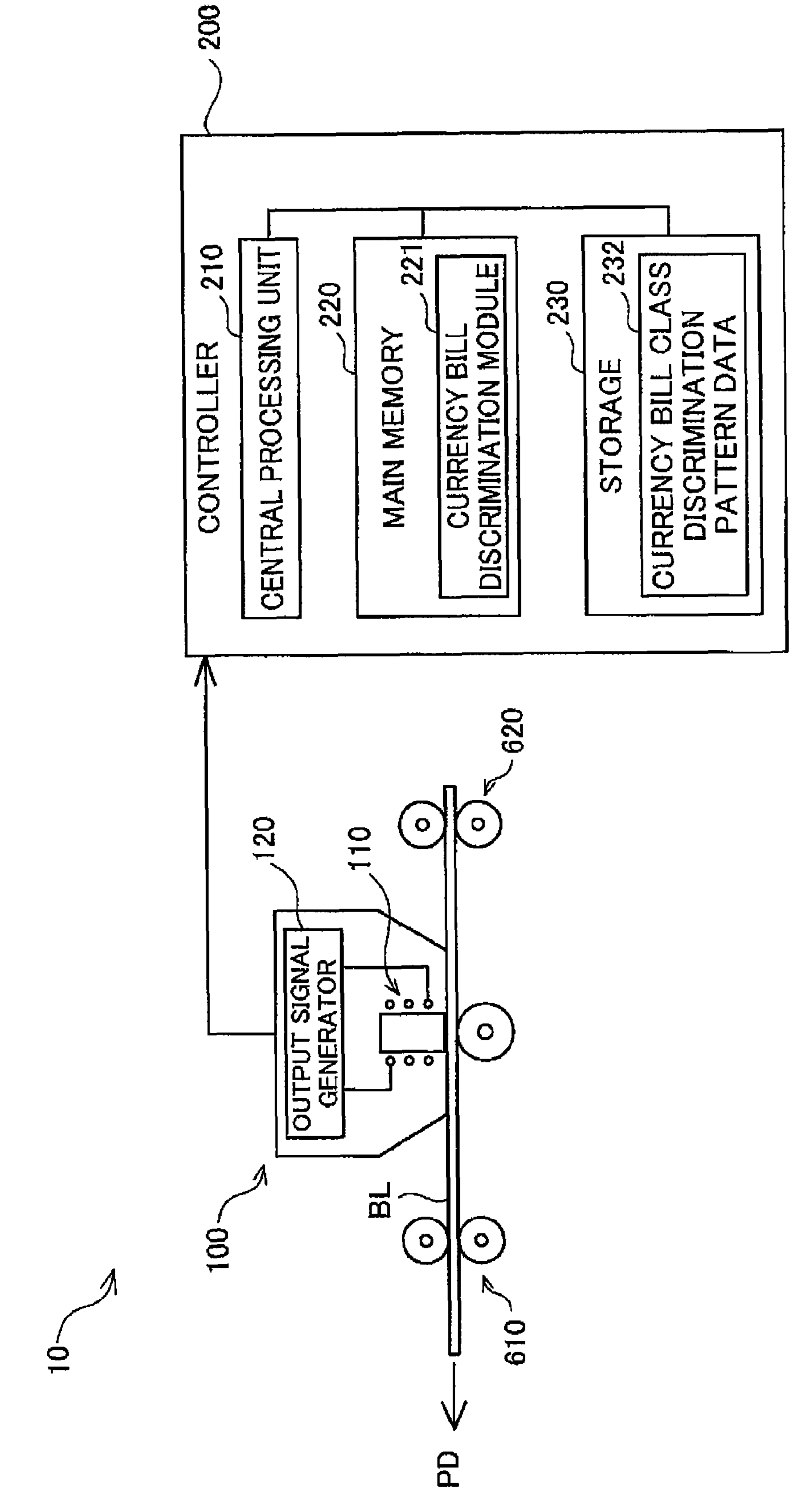
FIG. 1 is a block diagram depicting the design of a bill discrimination device.

FIG. 1 is a block diagram depicting the design of a bill discrimination device 10 according to a first embodiment of the present invention. The bill discrimination device 10 identifies type and/or authenticity of bank notes. The bill discrimination device 10 includes a sensor unit 100 and a controller 200.

The sensor unit 100 includes a variable inductance portion 110 and an output signal generator 120. A currency bill BL targeted for detection is transported in a given direction (shown by an arrow PD in the drawing) by transport mechanisms 610, 620. The sensor unit 100 thereby scans the currency bill BL in the transport direction PD and transmits to the controller 200 an output signal generated by the output signal generator 120. The information detected by the sensor unit 100 and the content of the output signal will be discussed later.

The controller 200 includes a central processing unit 210, a main memory 220, and storage 230. An application program, namely, a currency bill discrimination module 221, is stored in the main memory 220. Currency bill class discrimination pattern data 232 is stored in the storage 230. The currency bill class discrimination pattern data 232 represents data used for comparison purposes during the currency bill discrimination process, and is composed of master data for individual classes or denominations of currency bills corresponding with output signals from the sensor unit 100.

The currency bill discrimination module 221 discriminates classes of bills through comparison (pattern matching) of discrimination information represented by the output signal of the sensor unit 100 with the currency bill class discrimination pattern data 232 loaded from the storage 230. In the event that the currency bill class discrimination pattern data 232 contains no data which matches the discrimination information from the sensor unit 100, the currency bill discrimination module 221 will decide that the currency bill BL is counterfeit.

Figure 2A:
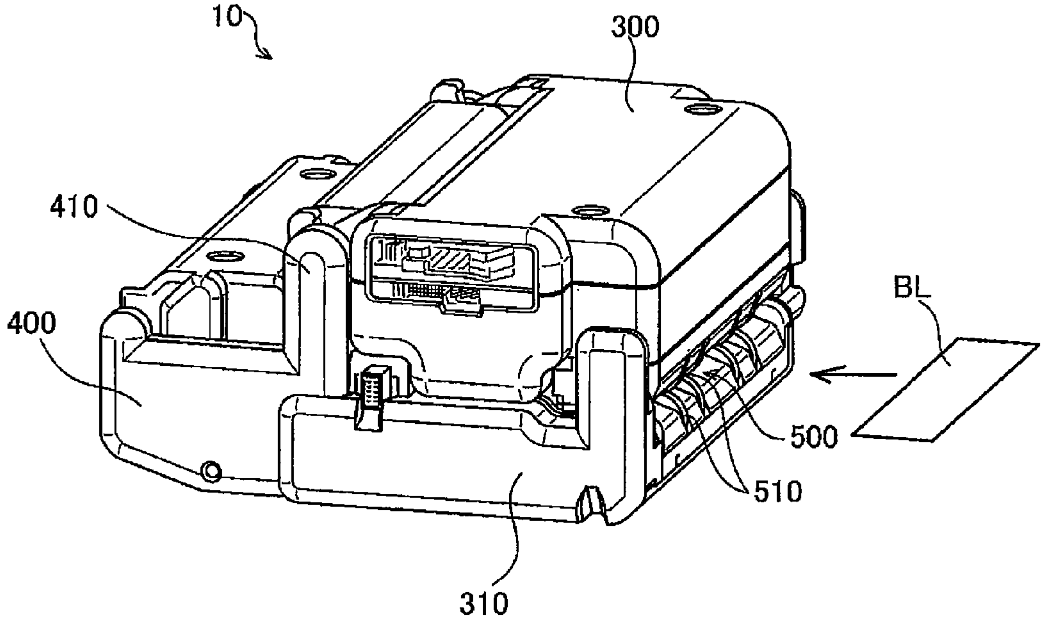
FIGS. 2A and 2B are schematic perspective views showing the exterior of a bill discrimination device.

FIG. 2A is a schematic perspective view of the exterior of the bill discrimination device 10. The bill discrimination device 10 includes an upper cover portion 300, a base portion 310, and a main unit portion 400. The upper cover portion 300 is positioned stacked on the upper side of the base portion 310 in the direction of gravity. The main unit portion 400 is linked to both the upper cover portion 300 and the base portion 310. More specifically, the main unit portion 400 and the base portion 310 are fixedly linked, while the main unit portion 400 and the upper cover portion 300 are linked by a hinge portion 410 so as to permit opening and closing. The upper cover portion 300 and the base portion 310 are provided with the sensor unit 100 shown in FIG. 1, while the controller 200 is housed in the main unit portion 400.

With the upper cover portion 300 in the closed position, a currency bill insertion slot 500 for inserting currency bills is defined at the contact interface of the base portion 310 with the upper cover portion 300 on the side thereof opposite from the hinge portion 410 of the bill discrimination device 10. In the bill insertion slot 500, both the upper cover portion 300 and the base portion 310 are provided with rollers 510 rotationally actuatable for the purpose of facilitating insertion of the currency bill BL. As shown in the drawing, the currency bill BL, oriented in the direction of its short sides, is inserted to the bill discrimination device 10 from the bill insertion slot 500.

Figure 2B:
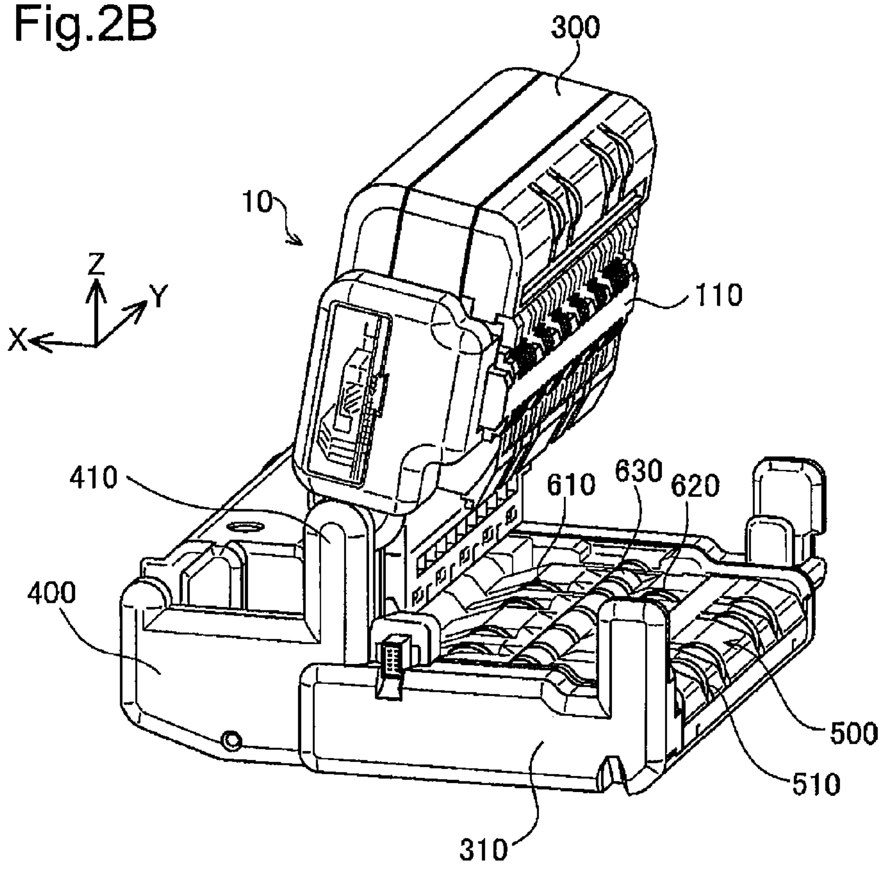

FIG. 2B depicts the bill discrimination device 10 with the upper cover portion 300 in the open position. The sensor unit 100, which is disposed on the upper cover portion 300 on the face thereof contacting the base portion 310, is arranged along the Y axis direction in the drawing. The transport mechanisms 610, 620, on the other hand, are disposed on the base portion 310 on the contact face thereof with the upper cover portion 300. The transport mechanisms 610, 620 are rotationally actuated by a motor in response to an instruction from the controller 200 (FIG. 1), and transport the currency bill BL in the X axis direction in the drawing. Auxiliary rollers 630 are disposed between the transport mechanisms 610, 620. The auxiliary rollers 630, like the transport mechanisms 610, 620, are arranged along the Y axis direction in the drawing so that, with the upper cover portion 300 in the closed position, they contact the sensor unit 100.

Figure 3:
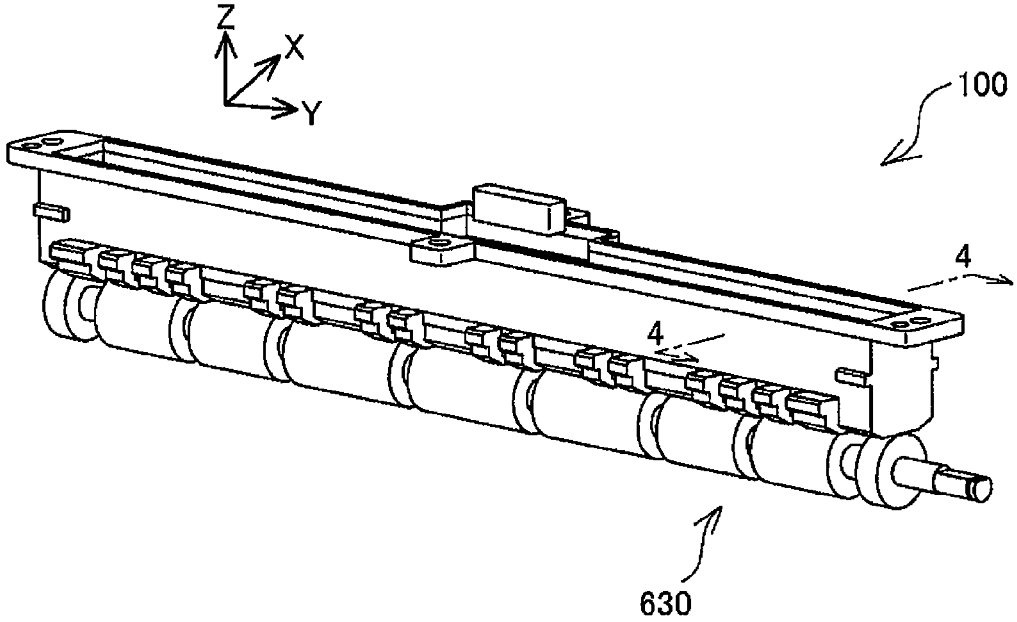
FIG. 3 is a schematic perspective view showing the exterior of part of a sensor unit.

FIG. 3 depicts the sensor unit 100 and the auxiliary rollers 630 with the upper cover portion 300 of the bill discrimination device 10 described in FIG. 2A in the closed position. In FIG. 3, elements besides the sensor unit 100 and the auxiliary rollers 630 have been omitted for clarity.

Figure 4:
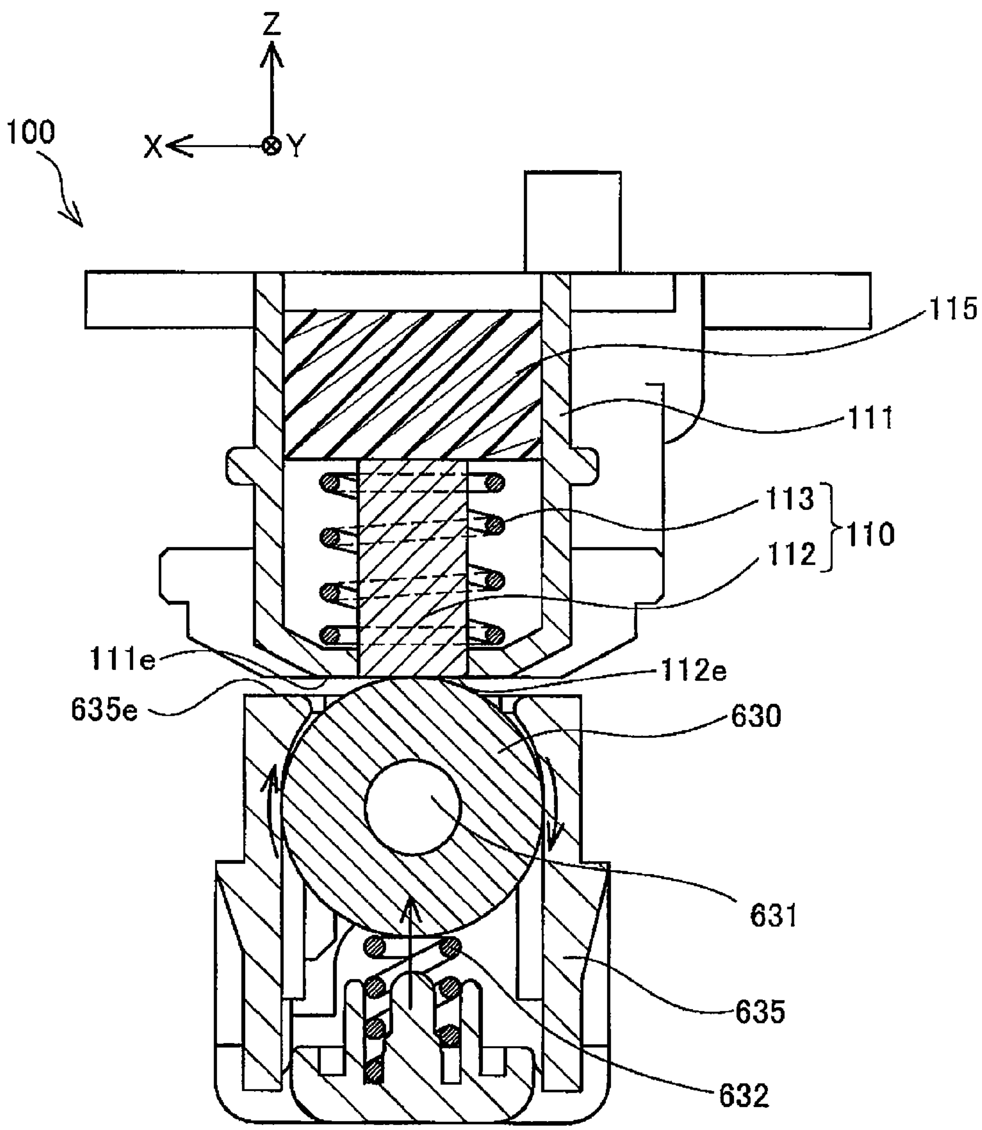
FIG. 4 is a schematic sectional view showing internal structure of part of a sensor unit.

FIG. 4 is a schematic sectional view of the sensor unit 100 and the auxiliary roller 630 in a cross section taken at the location of line 4-4 in FIG. 3. In FIG. 4, a casing 635 which houses the auxiliary roller 630 is additionally depicted.

Variable inductance portion 110 is housed inside a casing 111 of the sensor unit 100. The variable inductance portion 110 includes a straight rod-shaped contact member 112 composed of magnetostrictive material (e.g. ferrite) having magnetostrictive behavior, and a coil 113 which is positioned encircling the outside circumference of the contact member 112. The contact member 112 is fixed at one end by a resin 115 in the interior of the casing 111, while its other end passes through the bottom face 111*e* of the casing 111 and lies exposed to the outside. The sensor unit 100 is furnished with a plurality of variable inductance portions 110 which are arrayed in a row along the Y axis direction in FIG. 3.

There is provided a gap between the bottom face 111*e* of the casing 111 of the sensor unit 100, and the upper face 635*e* of the casing 635 of the auxiliary roller 630; the gap is sufficient to permit insertion of the currency bill BL targeted for detection. The auxiliary roller 630 is disposed with its rotating shaft 631 moveable up and down in the Z axis direction inside the casing 635, and is urged in the direction towards the sensor unit 100 by a spring 632. A through-hole is provided in the upper face 635*e* of the casing 635 so that part of the auxiliary roller 630 lies exposed to project out from the casing 635 and to come into contact with the contact member 112 of the sensor unit 100. Consequently, with no currency bill BL inserted, the contact member 112 of the sensor unit 100 will be subjected to a constant pressing force from the spring 632 via the auxiliary roller 630.

Figure 5:
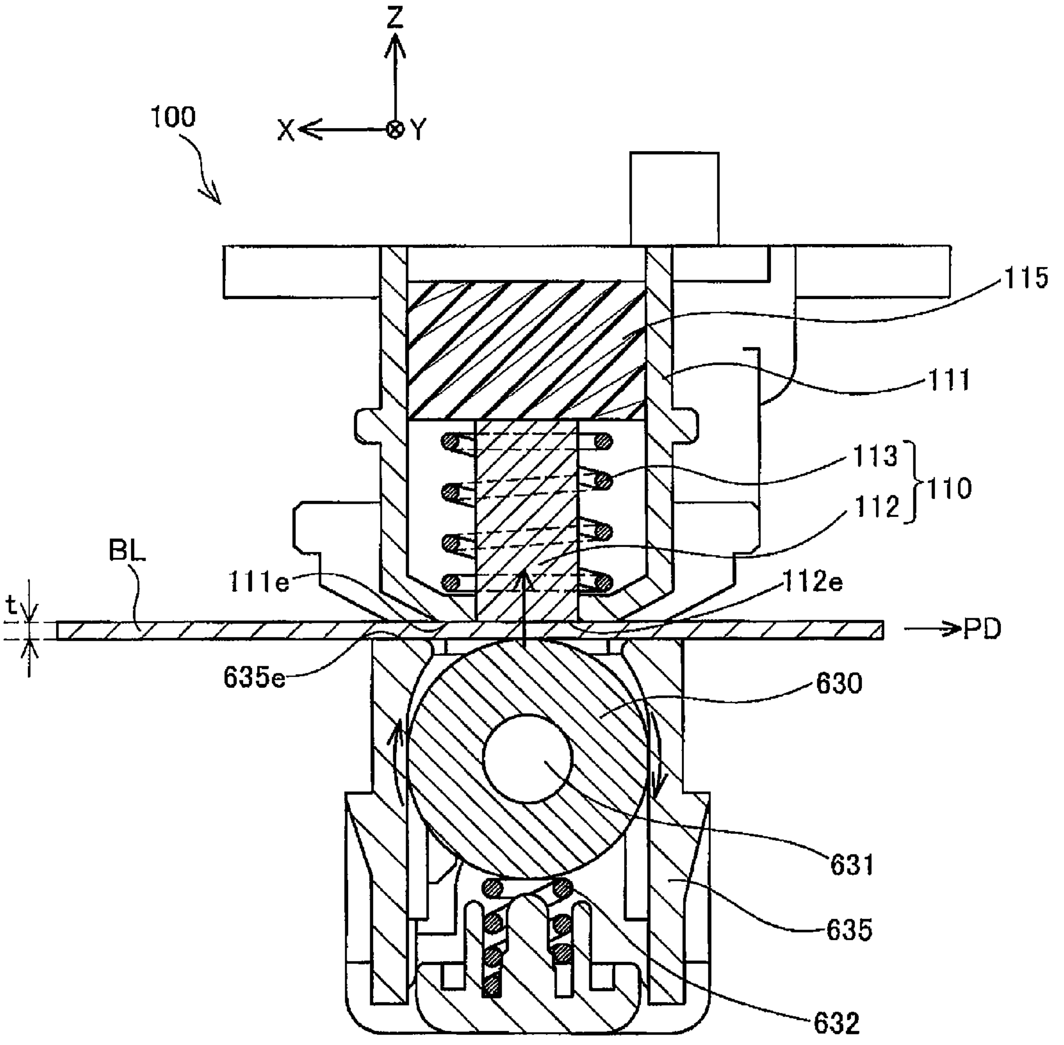
FIG. 5 is a schematic sectional view showing internal structure of part of a sensor unit scanning a document.

FIG. 5 depicts the sensor unit 100 and the auxiliary roller 630 with a currency bill BL inserted and being transported through the bill discrimination device 10; it is substantially identical to FIG. 4 except that the currency bill BL is shown. The currency bill BL is transported between the sensor unit 100 and the auxiliary roller 630 in the direction indicated by the arrow PD in the drawing. During this time, the rotating shaft 631 of the auxiliary roller 630 will be pressed downward in the direction of gravity by the equivalent of the thickness t of the currency bill BL. Consequently, the pressing force exerted on the contact member 112 of the sensor unit 100 by the spring 632 will increase proportionally with thickness t of the currency bill BL. Thereupon, the contact member 112, which has magnetostrictive behavior, will experience a change in magnetic permeability depending on the pressing force from the spring 632, and the inductance of the coil 113 will change accordingly. At the same time, the inductance of the coil 113 will also change depending on the amount of magnetic ink present on the currency bill BL in the area thereof contacting the contact member 112. The sensor unit 100 will output the changes in inductance of the variable inductance portion 110 as a sensor signal.

Figure 6A:
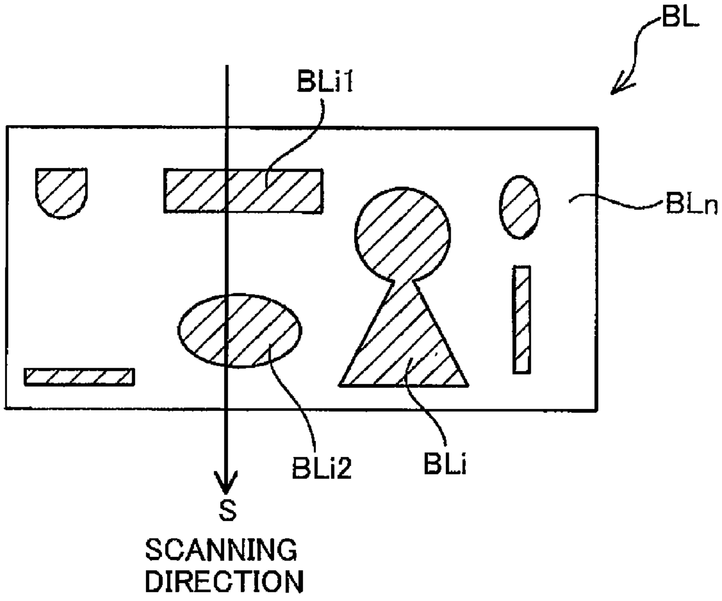
FIG. 6A is a schematic view of a currency bill.

FIG. 6A is a schematic illustration depicting in model form a currency bill BL targeted for detection. In FIG. 6A, printed areas are shown with hatching. The hatched printed areas will be termed "magnetic ink areas BLi" and the remaining area the "magnetic ink-free area BLn."

Figure 6B:
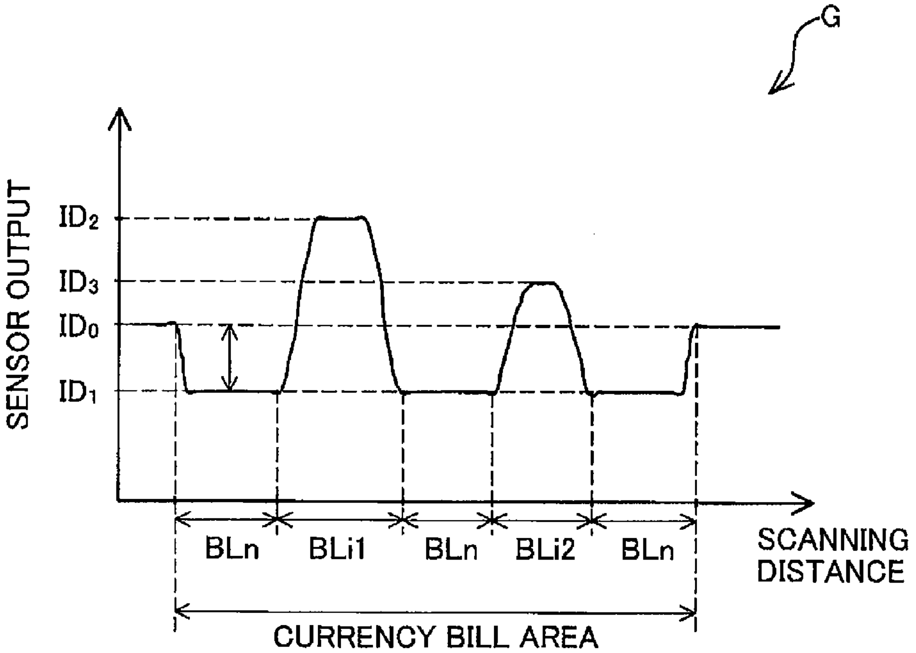
FIG. 6B is a graph showing the relationship between sensor unit scanning distance and output signal.

FIG. 6B is a graph depicting an output signal which will be output when one of the variable inductance portions 110 of the sensor unit 100 has scanned the currency bill BL along the arrow S of FIG. 6A. In this graph G, the horizontal axis indicates scanning distance by the sensor unit 100, and the vertical axis indicates the impedance value of the variable inductance portion 110 output by the sensor unit 100.

As shown by this graph G, when scanning of the currency bill BL commences, there is an initial drop in the inductance of the variable inductance portion 110 depending on the thickness of the currency bill BL. The output value of the sensor unit 100 at this point will be termed the "magnetic ink-free area output value $ID_1$." The output value of the sensor unit 100 prior to insertion of the currency bill BL will be termed the "baseline output value $ID_0$."

Subsequently, when the sensor unit 100 reaches a first magnetic ink area BLi_1 (FIG. 6A), there will be an increase in the inductance of the variable inductance portion 110 depending on the amount of the magnetic ink (magnetic charge) of the area in question. The output value of the sensor unit 100 at this point will be termed the "magnetic ink area output value $ID_2$." As the sensor unit 100 passes through the first magnetic ink area BLi_1 and again heads into the magnetic ink-free area BLn, the inductance of the variable inductance portion 110 will drop and the output value of the sensor unit 100 will return to the magnetic ink-free area output value $ID_1$.

When the scanning area of the sensor unit 100 reaches a second magnetic ink area BLi_2, the output value of the sensor unit 100 will increase to a magnetic ink area output value $ID_3$, responsive to the magnetic charge of the second magnetic ink area BLi_2. When the scanning area of the sensor unit 100 reaches the magnetic ink-free area BLn, the output value of the sensor unit 100 will change to the magnetic ink-free area output value $ID_1$; and when the scan of the currency bill BL concludes, the output value of the sensor unit 100 will return to the baseline output value $ID_0$.

As will be appreciated from the description up to this point, in the sensor unit 100, it is possible for the thickness of a currency bill to be detected from the difference between the baseline output value $ID_0$ and the magnetic ink-free area output value $ID_1$. Moreover, the amount of magnetic ink of individual areas of the currency bill BL will be detected from the difference between the magnetic ink-free area output value $ID_1$ and the magnetic ink area output values $ID_2$, $ID_3$.

In this way, the bill discrimination device 10 of the present embodiment is able to detect the thickness of the currency bill BL as well as the amount of magnetic ink in individual areas thereof from output values of each single variable inductance portion 110. It is accordingly possible to increase the amount of information available for use in discrimination without the need to increase the size of the device, as well as to improve the accuracy of discrimination by the device.

B. Embodiment 2

Figure 7:
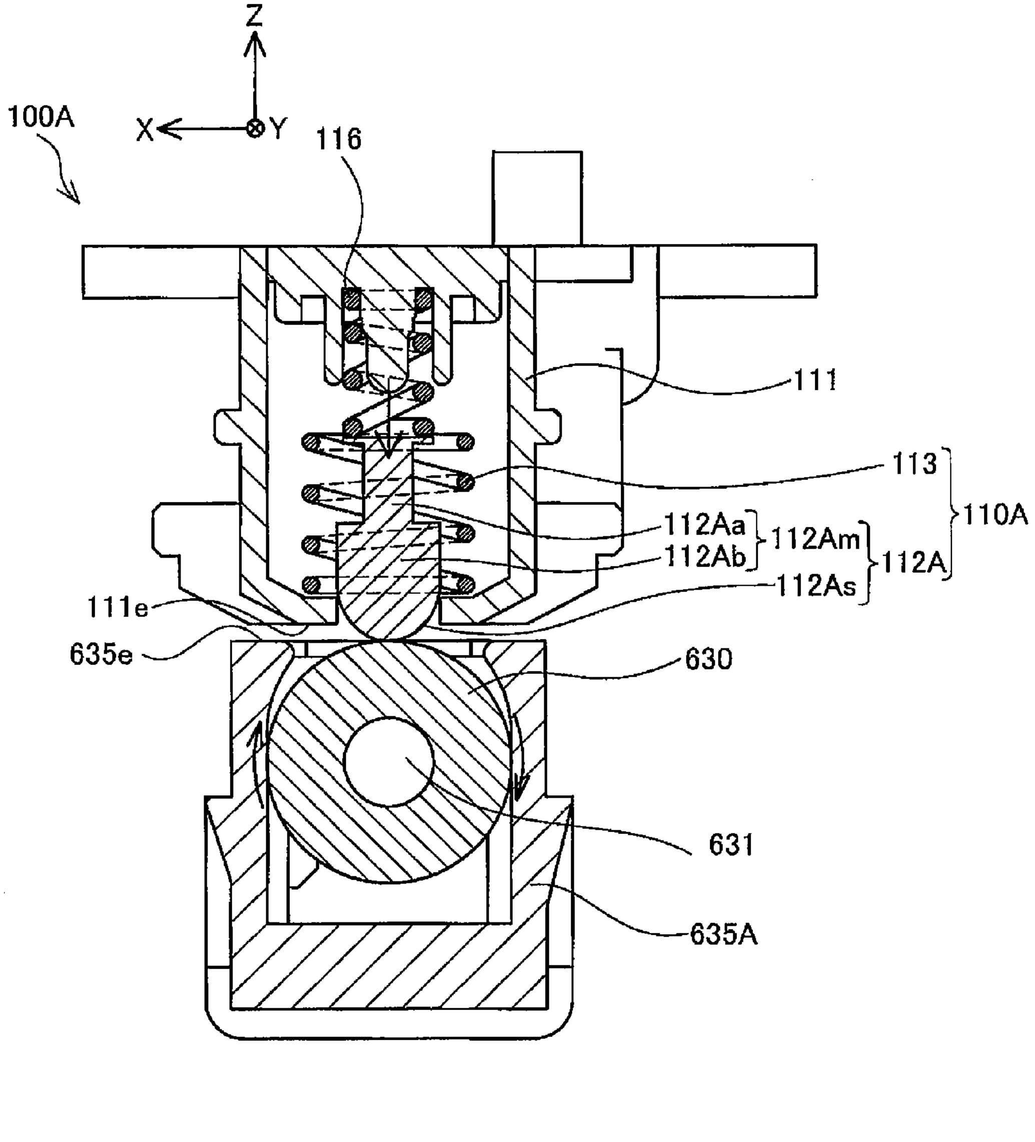
FIG. 7 is a schematic sectional view depicting part of internal structure of a sensor unit in Embodiment 2.

FIG. 7 is a schematic sectional view depicting the internal structure of a sensor unit of a bill discrimination device pertaining to a second embodiment of the present invention. The bill discrimination device of Embodiment 2 is similar to that described in Embodiment 1, except for the internal structure of the sensor unit 100A shown in FIG. 7.

The variable inductance portion 110A of the sensor unit 100A has, within a casing 111, a contact member 112A of generally circular cross section, and a coil 113 positioned about the circumference of the contact member 112A. In contrast to the contact members 112 in Embodiment 1, the contact member 112A is not required to have magnetostrictive characteristics.

The contact member 112A has at a first end a spherical face portion 112As which has been machined to a generally spherical shape; and the other end of the contact member 112A is linked to a spring 116 which has been disposed within the casing 111 so as to urge the contact member 112A in the direction of gravity. The contact member 112A is positioned so that the spherical face portion 112As projects out through a through-hole which has been provided in the bottom face 111*e* of the casing 111.

The contact member 112A has an upper portion 112Aa and a lower portion 112Ab between the spherical face portion 112As and the spring 116; these portions 112Aa, 112Ab are encircled by the coil 113. These portions 112Aa, 112Ab encircled by the coil 113 will be termed together as the "main body portion 112Am." This main body portion 112Am is designed so that the first portion 112Aa connected to the spring 116 has a relatively small radius, and the second portion 112Ab on the spherical face portion 112As end has a relatively large radius (e.g. a diameter ratio of 2:1). Consequently, as the contact member 112A moves downward in the Z axis direction under the urging of the spring 116, the inductance of the coil 113 will change in association with the diameter change of the member 112A.

In the same way as in Embodiment 1 (see FIG. 4), the auxiliary roller 630 is housed within a casing 635A; but in contrast to Embodiment 1, its rotating shaft 631 does not undergo displacement in the Z axis direction. A gap sufficient to permit insertion of a currency bill BL is defined between the upper face 635*e* of the casing 635 of the auxiliary roller 630, and the bottom face 111*e* of the casing 111 of the sensor unit 100A; and part of the side face of the auxiliary roller 630 lies exposed from the upper face 635*e* of the casing 635. Consequently, with no currency bill BL inserted, the spherical face portion 112As of the contact member 112A of the sensor unit 100A will project out from the bottom face ille of the casing 111 and contact the auxiliary roller 630.

Figure 8:
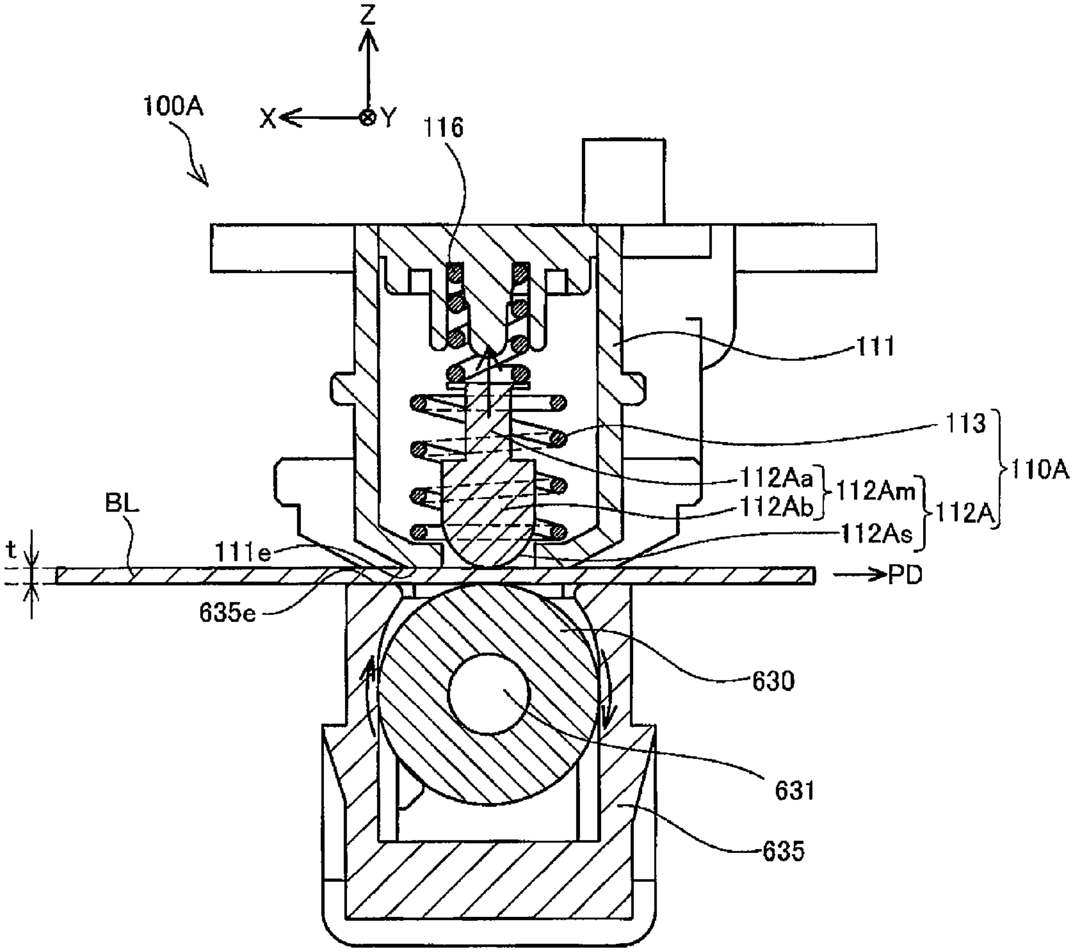
FIG. 8 is a schematic sectional view depicting part of internal structure of a sensor unit in Embodiment 2.

FIG. 8 depicts the sensor unit 100A and the auxiliary roller 630 with a currency bill BL inserted and transported through the bill discrimination device 10; it is substantially identical to FIG. 7 except that the currency bill BL is shown. The currency bill BL is gripped between the contact member 112A of the sensor unit 100A and the auxiliary roller 630 and transported in the direction indicated by the arrow PD in the drawing. During this time, the contact member 112 will experience displacement in the Z axis direction by the equivalent of the thickness t of the currency bill BL. Consequently, the inductance of the variable inductance portion 110A will change. At the same time, the inductance of the variable inductance portion 110A will also change depending on the amount of magnetic ink present on the currency bill BL in the area thereof contacting the contact member 112A. The sensor unit 100A will output the change in inductance of the variable inductance portion 110A as a sensor signal.

According to the present embodiment, even without the use of magnetostrictive material having magnetostrictive behavior as the contact member 112A, it will be possible in a manner similar to Embodiment 1 to simultaneously detect the thickness of a bill and the magnetic ink content of individual areas of the bill from each single variable inductance portion 110 A.

C. MODIFICATION EXAMPLES

The present invention is in no way limited to the preferred embodiments provided above, and various modifications such as the following can be made herein without departing from the scope of the invention.

C1. Modification Example 1

In the preceding embodiments, the bill discrimination device 10 is adapted to identify currency bills BL, but the device may be adapted to identify other types of bills or documents containing magnetic inks.

C2. Modification Example 2

The coils 113 and the contact members 112, 112A of the sensor units 100, 100A of the bill discrimination device 10 in the preceding embodiments may be omitted. It is sufficient for the sensor unit to have a variable inductance portion whose inductance changes depending on bill thickness and magnetic ink content, and an output signal generator for generating an output signal depending the inductance of the variable inductance portion.

What is claimed is:

1. A bill discrimination device for discrimination of a bill containing magnetic ink, comprising:

a sensor unit for detecting a bill; and an discrimination unit for discriminating the bill based on an output signal of the sensor unit;

wherein the sensor unit includes:

a variable inductance portion whose inductance changes responsive to thickness and magnetic ink amount of the bill; and an output signal generator for generating an output signal depending on the inductance of the variable inductance portion.

2. The bill discrimination device according to claim 1, wherein the variable inductance portion includes:

a contact member which is to contact a surface of the bill as the bill passes by the sensor unit;

a coil portion disposed around the contact member; and an urging mechanism to apply pressing force to the contact member via the bill, wherein the contact member is constituted by a magnetostrictive element whose magnetic permeability changes responsive to strain produced by the pressing force from the urging mechanism.

3. The bill discrimination device according to claim 1, wherein the variable inductance portion includes:

a contact member which is to contact a surface of the bill as the bill passes by the sensor unit;

a coil portion disposed around the contact member; and an urging mechanism to apply pressing force to the contact member toward the bill, wherein the contact member has a first portion, and a second portion which is smaller than the first portion in diameter.

4. The bill discrimination device according to claim 2, wherein the urging mechanism has a member which is in contact with the contact member even when no bill are present at the sensor unit, and when a bill is present at the sensor unit, the pressing force applied to the contact member from the urging mechanism is proportional to the thickness of the bill.

5. The bill discrimination device according to claim 1, wherein a plurality of the discrimination unit are arranged in line in a direction perpendicular to a transport direction of the bill.

6. The bill discrimination device according to claim 1, wherein the discrimination unit detects;

(i) a thickness of the bill from a difference between a first sensor output value and a second sensor output value, the first sensor output value being obtained when no bills are present at the sensor unit, the second sensor output value being obtained for a magnetic ink-free area within the bill; and (ii) an amount of magnetic ink in a magnetic ink area within the bill from a difference between the second sensor output value and a third sensor output value obtained for the magnetic ink area.

7. A sensor unit for discrimination of a bill containing magnetic ink, comprising:

a variable inductance portion whose inductance changes responsive to thickness and magnetic ink amount of the bill; and an output signal generator for generating an output signal depending on the inductance of the variable inductance portion, wherein the variable inductance portion includes:

a contact member which is to contact a surface of the bill as the bill passes by the sensor unit;

a coil portion disposed around the contact member; and an urging mechanism to apply pressing force to the contact member via the bill, wherein the contact member is constituted by a magnetostrictive element whose magnetic permeability changes responsive to strain produced by the pressing force from the urging mechanism.

8. A sensor unit for discrimination of a bill containing magnetic ink, comprising:

a variable inductance portion whose inductance changes responsive to thickness and magnetic ink amount of the bill; and an output signal generator for generating an output signal depending on the inductance of the variable inductance portion, the variable inductance portion includes:

a contact member which is to contact a surface of the bill as the bill passes by the sensor unit;

a coil portion disposed around the contact member; and an urging mechanism to apply pressing force to the contact member toward the bill, wherein the contact member has a first portion, and a second portion which is smaller than the first portion in diameter.

* * * * *